Figure 1:
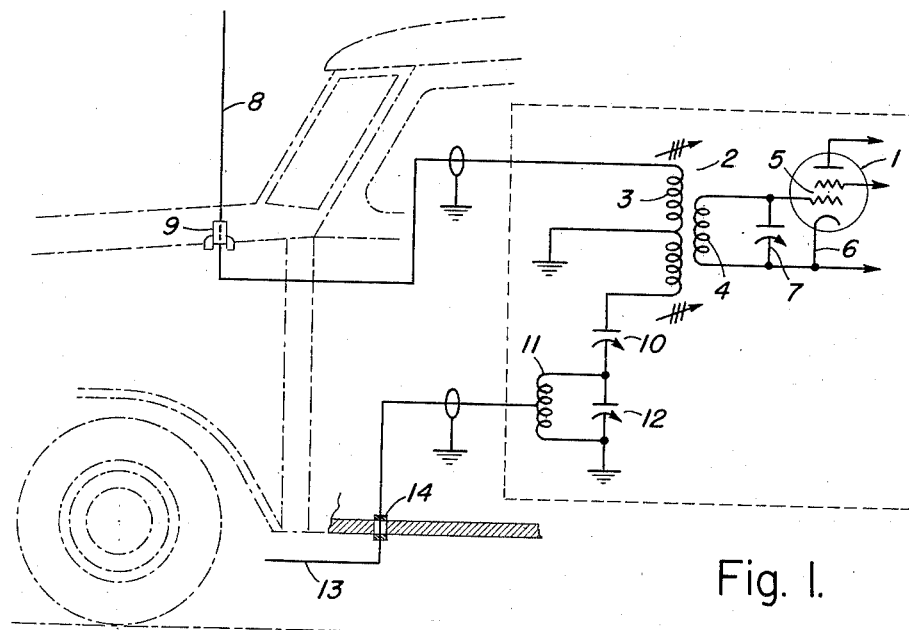

June 24, 1952  J. FRYE  2,601,510

SYSTEM FOR ELIMINATING STATIC INTERFERENCE

Filed Feb. 6, 1948

INVENTOR
Jack Frye
BY
Donald F. McCarthy
ATTORNEY

Patented June 24, 1952

2,601,510

UNITED STATES PATENT OFFICE 2,601,510

SYSTEM FOR ELIMINATING STATIC INTERFERENCE

Jack Frye, Sedona, Ariz.

Application February 6, 1948, Serial No. 6,755

3 Claims. (Cl. 250—20)

This invention relates to interference eliminating systems for radio receivers and particularly to the elimination of static disturbances in automotive installations where the disturbance is generated by the motion of the vehicle.

Radio receiving systems in mobile installations are subjected to certain types of interference which is produced by the motion of the carrier on which the receiver is located. This type of interference originates in one form or another in certain parts of the carrier and is generally created by friction. It may be defined as a static charge which produces electrical disturbances due to the fluctuation of the charge as it is generated and partially discharged in the surrounding medium.

In airplanes such static charges may be discharged at a sufficient distance from the receiving antenna by means of a trailer wire, for example, and thereby reduce the interference satisfactorily to maintain radio communication. In land vehicles the problem does not present such a ready solution since the origin of the disturbance is more localized and physically inseparable from the receiving system.

The type of interference to which this invention is particularly directed is manifest in automotive vehicles and is commonly known as "wheel static." The cause is attributed to the friction of the rubber wheels on the smooth surface of the highway which builds up a static charge on the wheel. This condition is created chiefly by the insulating effect of the grease on the ball bearing of the wheel. The thin film of grease separating electrically the wheel from the axle and the body of the car forms an effective capacity and a high resistance leakage path to electrical charges. The leakage therethrough is believed to cause an oscillatory discharge which is picked up in the receiving antenna.

Various means have been proposed to eliminate this interference, mainly in the form of shunts, which are intended to bypass the high resistance leakage path. Spring inserts between the tip of the axle and the hub of the wheel have been tried with some success, as long as good electrical connection could be maintained between these points. Aside from that it was necessary also to provide a conductive path between the hub and the tire so as to reduce the insulating effect and for this purpose graphite bands have been applied around the tire or introduced in the rubber composition.

The present invention has for its object to eliminate the interference produced by wheel static in a manner heretofore not suggested. To this end means are provided for collecting radio frequency energy from the static so generated and introduce this energy into the receiving system and there combine it with the static signal normally received from the same source in an electrically opposing relation and in this manner cancel the two signals whereby the unwanted signal is substantially eliminated.

A particular feature of this invention is that the means employed are easily applied to all types of receiving systems, and being chiefly electrical in character, have considerable flexibility of application.

A particular advantage of the system, in accordance with this invention, is that simple standard radio components are utilized which may be incorporated in radio receivers in their manufacture at very little cost and will not interfere in their normal operation.

An additional advantage of the system herein described is that it may also be applied to existing installations in the form of a simple accessory attached to the radio receiver.

Figure 2:
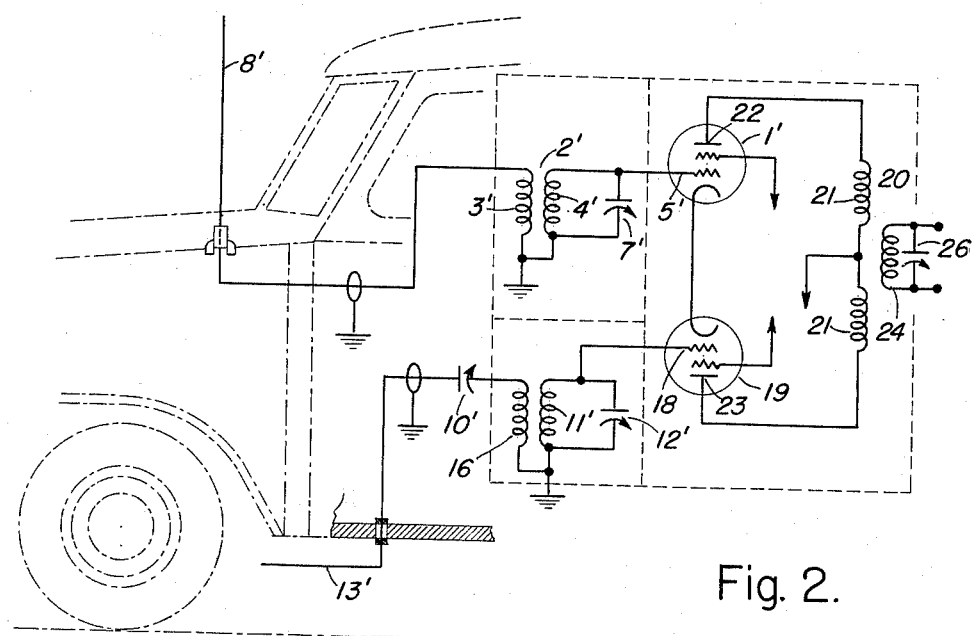

Other features and advantages will be apparent from the following description of the invention, defined in particularity in the appended claims and taken in connection with the accompanying drawing in which Fig. 1 shows a schematic circuit of one form of the static eliminating system applied to automobile radio installation, Fig. 2, a schematic circuit of a modified form for cancelling the static signal applied to an automobile radio installation.

It has been observed that wheel static interference is predominantly in the high frequency tuning range of the receiver. Although the static signal is not confined sharply to a particular frequency, it is of such character that a comparatively narrow band in the wide range thereof causes the most pronounced interference and is generally of sufficient magnitude to "ride in," even on the strong signal of a station although the sensitivity of the receiver is substantially reduced due to automatic volume control action.

The frequency of the static signal depends on the physical elements of the car which generates the intereference. Consequently, the signal varies with various types of cars and receiver installations. For this reason, simple fixed filters are impractical since even if the interference frequency is by-passed, this being in the pass band of the receiver, the desired signal would be similarly filtered out.

In the following description of the system, it will be seen that the normal input channel of the receiver is allowed to pass the desired signal as well as the interference signal and an auxiliary input channel is provided which passes predominantly the interference to which transmission components in this channel are particularly tuned.

Referring to the drawing, it is to be noted that for the purpose of clearer illustration, only the portion of the receiver is shown to which the circuit of the interference eliminating system is generally applied. This may be the antenna input circuit of the receiver, or as will be seen in the modification in Figure 2, the radio frequency amplifier portion. Similar component elements in the two figures bear identical reference characters distinguished by primary indices.

In Figure 1, the input circuit to the amplifier tube 1 comprises an antenna coupling transformer 2, having a primary winding 3 and a secondary winding 4. The latter is connected in a conventional manner to the input of the radio frequency amplifier tube 1 of the receiver, between control rgid 5 and cathode 6. This circuit is tuned by the condenser 7 which is an integral part of the station selector device of the radio receiver.

The primary winding 3 is divided into two sections, the midpoint of which is returned to the ground potential side of the receiver. One portion of the winding 3 connects to the antenna 8, which may be the customary whip aerial used in automotive receivers. This is properly insulated from the car body by the insulator 9. The other portion of the primary winding is capacitively coupled by means of the condenser 10 to the tuned circuit, comprising inductance 11 and condenser 12. An auxiliary antenna 13 is provided which is located under the car, preferably in close proximity to one of the wheels in order to be near the source of disturbance. This auxiliary or noise pick-up antenna 13 is also insulated from the car frame by means of the insulating bushing 14 and is connected to a suitable tap on the inductance 10 through a shielded lead as is the general practice in such installations. The shielding of both antenna leads is shown by conventional shielding symbols.

The primary winding 3 of the transformer 2 is so divided as to form an electrically balanced circuit whereby currents in the two windings have a cancelling effect. Minor differences in the balancing of the two halves of this winding may be adjusted by permeability tuning slugs indicated here by the conventional permeability tuning symbol.

As mentioned before, the noise antenna 13 feeds into winding 11 which forms a parallel tuned circuit with the condenser 12. The latter is adjusted to resonate the circuit to a predominant frequency of the noise signal created by the wheel static. The signal voltage built up in the tuned circuit from the auxiliary antenna 13 is applied to the primary winding 3 through the coupling condenser 10. In order to obtain proper balance between currents in the two portions of the primary winding in the noise frequency range, condenser 10 is adjusted upon installation of the receiver to the magnitude of current required to cancel the current which is received from the static charge in the antenna 8. In this manner the two currents being substantially equal will cancel in the primary winding 3 and only the signal currents will be transferred to the secondary winding 4. The condenser 12 on the other hand is adjusted to resonate the circuit to the frequency portion of the static discharges which is the most predominant component of the unwanted signal and is desired to be suppressed.

In the system described in connection with Figure 1, the cancelling of the undesired signal is effected in the input circuit of the first radio frequency amplifier stage. In Figure 2 a circuit modification is shown wherein the cancelling effect is produced in the output circuit of the amplifier stage. The two input channels, namely the one from the antenna 8' and the other from the noise pickup antenna 13' are similarly constructed and electrically isolated from each other as shown by the dotted lines representing the shielding of the components.

Input transformer 2' having a primary winding 3' and a secondary winding 4' connects to the antenna 8' and the grid 5', respectively. The grid circuit of the amplifier tube 1' is tuned by means of the tuning condenser 7' which is an integral part of the station selector of the receiver. The noise pick-up antenna 13' is located also under the car in proximity of the wheel in order to be close to the origin or source of static disturbance. The shielded input lead from the antenna 13' is coupled by means of an adjustable condenser 10' with the primary winding 16 of a radio frequency transformer. The secondary winding 11' is tuned by means of the condenser 12' in parallel therewith and the high potential terminal of the winding 11' connects to the grid 18 of amplifier tube 19, whereas the other terminal connects to ground.

It should be noted here that the amplifier tubes 1' and 19 while separated in regard to their function need not be separate elements in the physical embodiment of the receiver. A single tube of the dual element type may be utilized incorporating a common cathode and distinct and separate input and output elements.

It has been shown that the input coupling to the grids of the amplifier tubes from the two distinct antennae are electrically similar and there exists no inter-coupling between them. The first input channel from the normal receiving antenna 8' will transfer the desired signal voltage as well as the interfering noise voltage to the grid 5' of the amplifier tube 1'. In the second channel the noise voltage predominates by virtue of the fact that the noise pick-up antenna 13' is close to the source of disturbance and also due to the fact that the transfer circuit is tuned by means of the condenser 12' to the predominant frequency of the noise signal. The required signal transmission from the antenna 13' may be effected by tuning the series resonant circuit consisting of the winding 16 and the variable condenser 10'.

In the common output circuit of the two amplifiers there is provided a coupling transformer 20 having a divided primary winding 21 of which one portion connects to the anode 22 of the amplifier tube 1', and the other portion to the anode 23 of the amplifier tube 19. The secondary winding 24 of this transformer is the output of the amplifier stage which feeds the signal to the succeeding amplifier stages of the receiver. Considered from another point of view, the terminals of this winding form the input to the remaining portion of the receiver as for example to the first detector stage if a super heterodyne type circuit is used. In any event, the secondary winding 24 is proportioned to be resonated with the tuning condenser 26 to the desired signal in the same manner as the input circuit of the normal signal input channel is tuned by the condenser 7'. Both condensers 7' and 26 are integral parts of the normal radio receiver.

The power supply connections to the screen grids and anode of the tubes as well as the cathode heater elements have not been completed in the drawings in order to simplify the illustration which is confined only to the essential parts and circuit pertaining to the invention. These connections are obvious to all those skilled in the art and well understood in the technique of radio receiver design and production.

In the operation of the interference eliminating system shown in Figure 2, the desired signal is applied together with whatever interfering signal may be super-posed thereon to the input circuit of an amplifier tube and a noise voltage derived from an auxiliary pick-up device is applied to the grid of another amplifying tube. The circuit associated with the noise pick-up is so proportioned that a frequency may be selected from the interference frequency spectrum which is the same as the one predominantly appearing super-posed on the desired signal. The magnitude of this selected interference frequency signal may be adjusted, for example, by adjusting the condenser 10' to a value whereby the interference signal components on both grids 5' and 18 of the respective amplifier tubes are substantially of the same magnitude. The two interference signal voltages appearing in the input circuit of the amplifier tubes are combined in opposing electrical phase relation in the output circuit, namely the primary winding of the transformer 20 wherein they will substantially cancel. Signal transfer on the other hand, of the desired signal appearing in the normal receiver input circuit is amplified by the amplifier tube 1' and in the output circuit thereof is transferred to the secondary winding 24' for further utilization in the radio receiver. Of this signal the auxiliary pick-up antenna 13' being shielded by the car body and of small physical size will transfer a signal voltage of negligible magnitude compared to the one transferred from the normal car antenna.

From the above it will be seen that the interference eliminating system, in accordance with this invention, is biased on the idea of providing an auxiliary antenna in an automotive vehicle located in close proximity to the source of disturbance, such as wheel static, and transfer the noise signal by means of a circuit in which the noise or interference is stronger and more predominant than in the normal receiving channel of the radio receiver. In the noise transfer circuit, standard electrical components are utilized to select from the bandwidth of the interfering noise signal a portion which predominantly appears in the normal input circuit of the radio receiver as the unwanted signal, and to combine the selected interference frequency in such manner as to cancel the interference signal. This may be accomplished prior to the first amplifier stage of the receiver in one modification, or two signals may be combined after amplification and cancelled as shown in the second modification. In the latter, the additional amplification of the signal and the easier balancing of circuits between two amplifying tubes offers certain advantages to the designer.

The noise pick-up antenna is preferably so dimensioned as to have poor transfer efficiency for the normal broadcast frequencies. It may be considerably shorter than the regular whip antenna and so placed under the car as to be well shielded. It is to be placed also as close as possible to one of the wheels in order to be the strong immediate field of the static disturbance. In certain cases more than one noise pick-up antenna may be provided and the best location determined by the largest amount of noise signal obtained.

The particular circuits shown for cancelling the two noise voltages or signals have been selected by way of example and other balanced circuits or bridge circuits known in the art may also be used advantageously without departing from the spirit of the invention.

In existing automotive installations the type of circuit shown in Fig. 1 may advantageously be employed for a separate electrical component, e. g., an accessory which is to be inserted between the car antenna and the normal input of the receiver. When this is built as a separate component the circuit elements within the shielded portion will remain unaltered except that the vacuum tube is omitted and instead the winding 4, without the use of the condenser, will terminate between the antenna input post of the receiver and ground. Of course in this case, for the purpose of efficient coupling the winding 4 must be so proportioned as to match the antenna input circuit of the receiver.

What is claimed is:

1. In an automobile radio installation subjected to wheel static interference having a predominant interfering frequency, a radio receiver, an input circuit for said receiver including a transformer having a divided primary winding the mid point of which is connected to ground, a normal signal antenna connected to one portion of said winding, an auxiliary noise pick-up antenna located near one of the wheels, a connection between said noise pick-up antenna and the other portion of said primary winding comprising a resonant circuit tuned to said interfering frequency and a series impedance adjustable for desired magnitude and phase of current transfer in said last-named portion for cancelling currents in said winding at said frequency.

2. In an automobile radio installation subjected to wheel static interference having a predominant interfering frequency, a radio receiver, an input circuit for said receiver including a transformer having a divided primary winding the mid point of which is connected to ground, a normal signal antenna connected to one portion of said winding, an auxiliary noise pick-up antenna located near one of the wheels, a connection between said noise pick-up antenna and the other portion of said primary winding comprising a resonant circuit tuned to said interfering frequency and a capacity in series adjustable for desired magnitude and phase of current transfer in said last-named portion for cancelling currents in said winding at said frequency.

3. In an automobile radio installation subjected to wheel static interference, a radio receiver, a first input circuit for said receiver connected to a normal signal antenna, a second input circuit connected to a noise pick-up antenna located near one of the wheels, an amplifier for each said input circuit including a vacuum tube, a coupling transformer having a divided primary winding the mid point of which is connected to ground, one portion of said winding being connected to the output circuit of one of said amplifiers, and the other portion to the output circuit of the other of said amplifiers, and a transformer in said second input circuit having a secondary winding tuned to said interfering frequency and a primary winding connected to said noise pick-up antenna said connection including a condenser in series adjustable for desired magnitude and phase of current transfer for equalizing the output current of said amplifiers in said divided winding at said interference frequency.

JACK FRYE.

REFERENCES CITED

The following references are of record in the file of this patent:

UNITED STATES PATENTS

| Number | Name | Date |
|---|---|---|
| Re. 21,157 | Alexander | July 25, 1939 |
| 1,309,400 | Espenschied | July 8, 1919 |
| 1,723,391 | Weinberger | Aug. 6, 1929 |
| 1,855,184 | Fischer | Apr. 26, 1932 |
| 1,872,487 | Miller | Aug. 16, 1932 |
| 2,047,153 | Mitchell | July 7, 1936 |
| 2,104,800 | Grandy et al. | Jan. 11, 1938 |
| 2,132,875 | Myers | Oct. 11, 1938 |
| 2,316,549 | Benson | Apr. 13, 1943 |

FOREIGN PATENTS

| Number | Country | Date |
|---|---|---|
| 802,392 | France | June 6, 1936 |